(12) United States Patent
Iwashita et al.

(10) Patent No.: US 11,131,915 B2
(45) Date of Patent: Sep. 28, 2021

(54) LIGHT SOURCE DEVICE AND PROJECTOR

(71) Applicant: SEIKO EPSON CORPORATION, Tokyo (JP)

(72) Inventors: Naoki Iwashita, Matsumoto (JP); Kenshi Sakai, Matsukawa-mura (JP); Hiroaki Yanai, Azumino (JP); Tomohiro Yokoo, Matsumoto (JP); Makoto Zakoji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/942,873

(22) Filed: Jul. 30, 2020

(65) Prior Publication Data

US 2021/0041777 A1 Feb. 11, 2021

(30) Foreign Application Priority Data

Aug. 6, 2019 (JP) .............................. JP2019-144505

(51) Int. Cl.
*G03B 21/20* (2006.01)
*G03B 21/16* (2006.01)
*G03B 21/14* (2006.01)
*G03B 33/12* (2006.01)

(52) U.S. Cl.
CPC ......... *G03B 21/204* (2013.01); *G03B 21/145* (2013.01); *G03B 21/16* (2013.01); *G03B 33/12* (2013.01)

(58) Field of Classification Search
CPC .................................................... G03B 33/12

USPC ......................................................... 353/119
See application file for complete search history.

(56) References Cited

U.S. PATENT DOCUMENTS

| 6,833,944 B2 * | 12/2004 | Liu ..................... G02B 26/0841 |
| | | 359/298 |
| 2014/0176915 A1 * | 6/2014 | Yamamoto ........... H04N 9/3164 |
| | | 353/31 |
| 2017/0052434 A1 * | 2/2017 | Masuda ............... G03B 21/204 |
| 2018/0292740 A1 | 10/2018 | Takagi |
| 2019/0391385 A1 * | 12/2019 | Mashimo ............. G02B 26/008 |
| 2020/0225564 A1 * | 7/2020 | Sato ....................... G03B 21/14 |

FOREIGN PATENT DOCUMENTS

| JP | 2014-123014 A | 7/2014 |
| JP | 2018-180107 A | 11/2018 |

* cited by examiner

*Primary Examiner* — Jerry L Brooks
(74) *Attorney, Agent, or Firm* — Dority & Manning, P.A.

(57) ABSTRACT

A light source device of the present disclosure includes a light source, a wavelength conversion element having a fluorescent material that a light output from the light source enters and a supporting substrate that supports the fluorescent material, an optical element guiding the light output from the light source to the fluorescent material, a holding member holding the optical element, and a housing part providing a housing space in an optical path of the light output from the light source and housing at least the optical element and the holding member in the housing space, wherein the supporting substrate is fixed to the holding member, the holding member is fixed to the housing part, and an elastic member is provided between the supporting substrate and the holding member.

16 Claims, 5 Drawing Sheets

LIGHT SOURCE DEVICE AND PROJECTOR

The present application is based on, and claims priority from JP Application Serial Number 2019-144505, filed Aug. 6, 2019, the disclosure of which is hereby incorporated by reference herein in its entirety.

BACKGROUND

1. Technical Field

The present disclosure relates to a light source device and projector.

2. Related Art

Recently, as a light source device for projector, a light source device using a laser light source and a fluorescent material has attracted attention. As the light source device, there is a light source device supporting a fluorescence emitting device to face a light guide system on a supporting member (for example, see JP-A-2018-180107).

When dust adheres to a fluorescent material in a fluorescence emitting device, the fluorescent material may be degraded or broken. Accordingly, there is a light source device employing a dustproof structure having a plate on which a fluorescent material plate is bonded and held and a lens in close contact (for example, see JP-A-2014-123014).

In the above described light source devices, an adhesive agent may be used for a sealed portion to further increase sealability. However, when a sealed structure is formed using an adhesive agent, the fluorescent material may be degraded due to a gas generated from the adhesive agent.

SUMMARY

A light source device according to a first aspect of the present disclosure includes a light source, a wavelength conversion element having a fluorescent material that a light output from the light source enters and a supporting substrate that supports the fluorescent material, an optical element guiding the light output from the light source to the fluorescent material, a holding member holding the optical element, and a housing part providing a housing space in an optical path of the light output from the light source and housing at least the optical element and the holding member in the housing space, wherein the supporting substrate is fixed to the holding member, the holding member is fixed to the housing part, and an elastic member is provided between the supporting substrate and the holding member.

In the light source device according to the aspect, the supporting substrate may have a first surface, the fluorescent material may be provided on the first surface, and the elastic member may be provided along the first surface to surround the fluorescent material.

In the light source device according to the aspect, a recessed portion may be provided at least in one of the supporting substrate and the holding member, and the elastic member may be placed in the recessed portion.

A projector according to a second aspect of the present disclosure includes the light source device according to the first aspect, a light modulation device that modulates the light from the light source device according to image information, and a projection optical device that projects the light modulated by the light modulation device.

BRIEF DESCRIPTION OF THE DRAWLNGS

Figure 3:
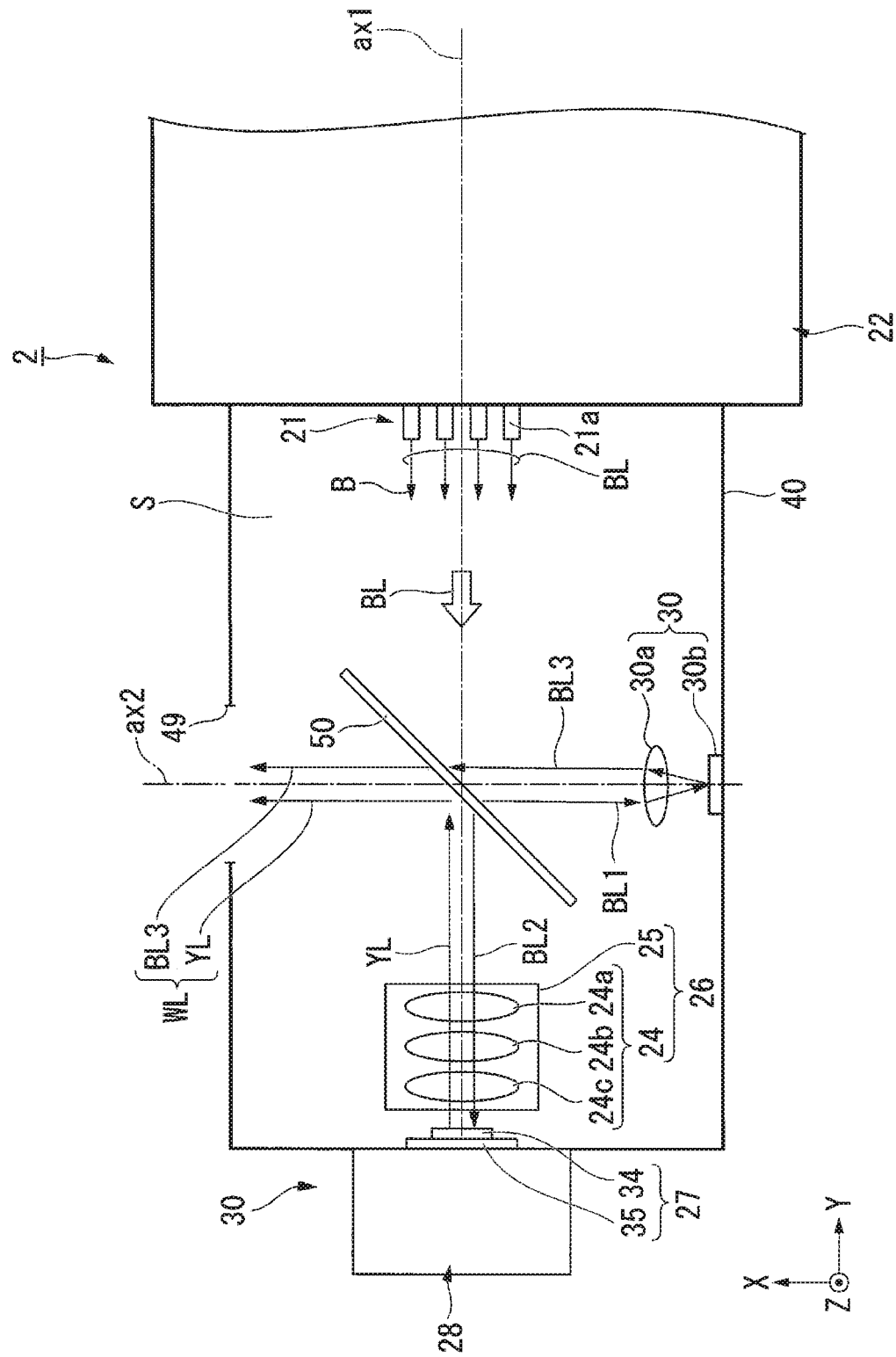

FIG. 3 schematically shows optical paths of lights passing through a housing space of a housing part.

Figure 4:
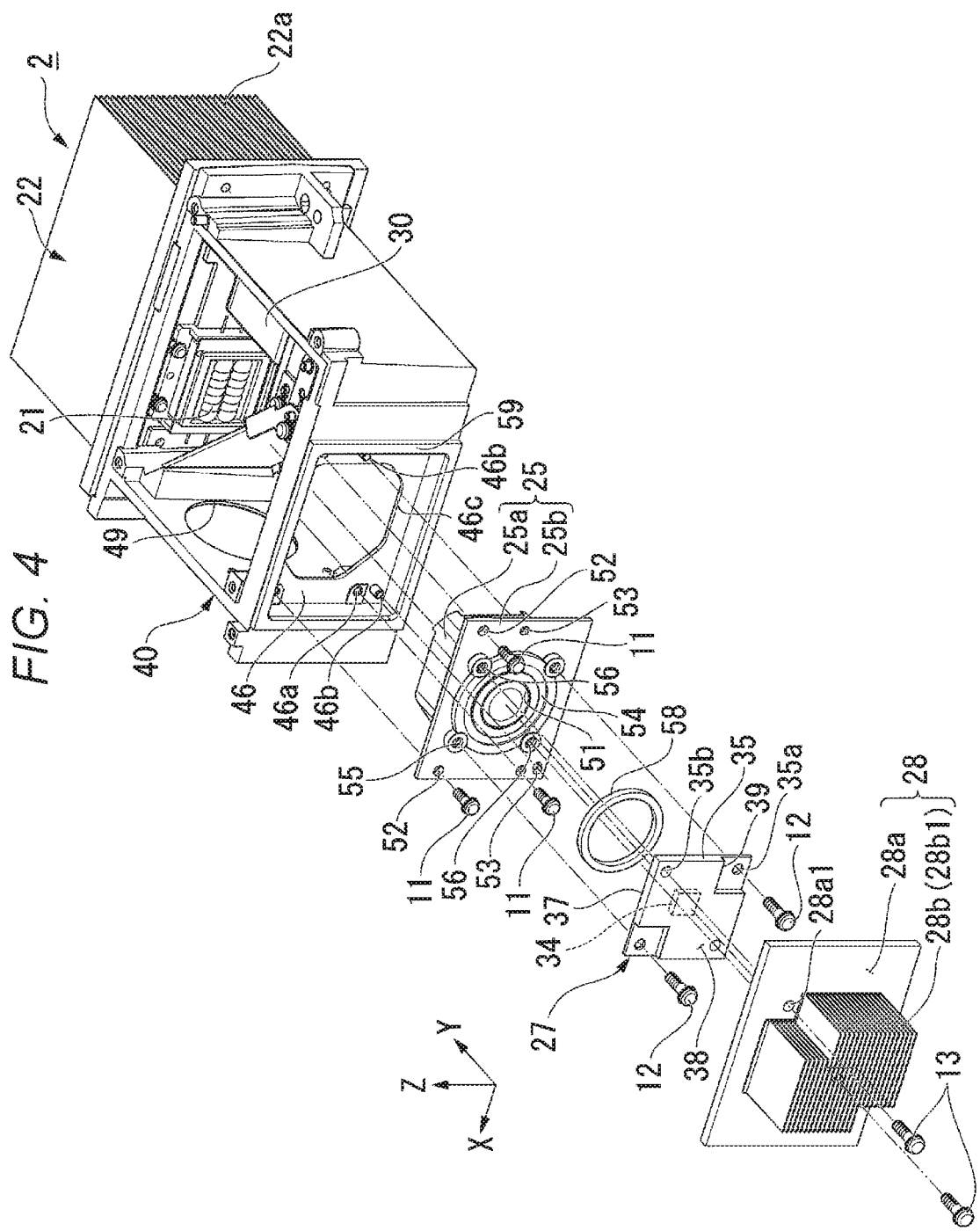

FIG. 4 is an exploded view of a main part configuration of the light source device.

Figure 5:
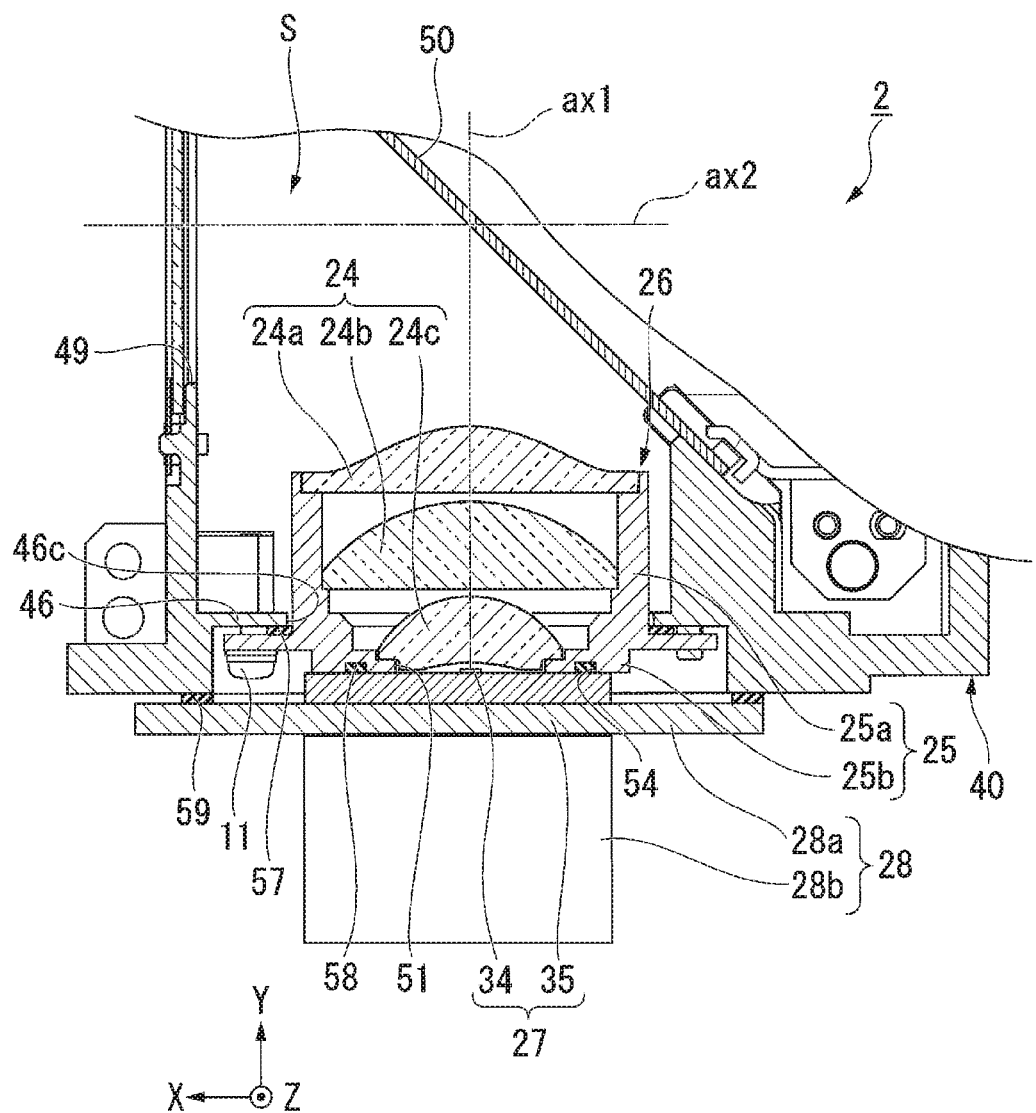

FIG. 5 is a sectional view of a main part of the light source device.

DESCRIPTION OF EXEMPLARY EMBODIMENTS

First Embodiment

As below, embodiments of the present disclosure will be explained with reference to the drawings. Note that, to clearly show the characteristics, in the drawings used in the following explanation, characteristic portions may be enlarged for convenience and dimension ratios of the respective component elements are not necessarily the same as the real ratios.

Projector

Figure 1:
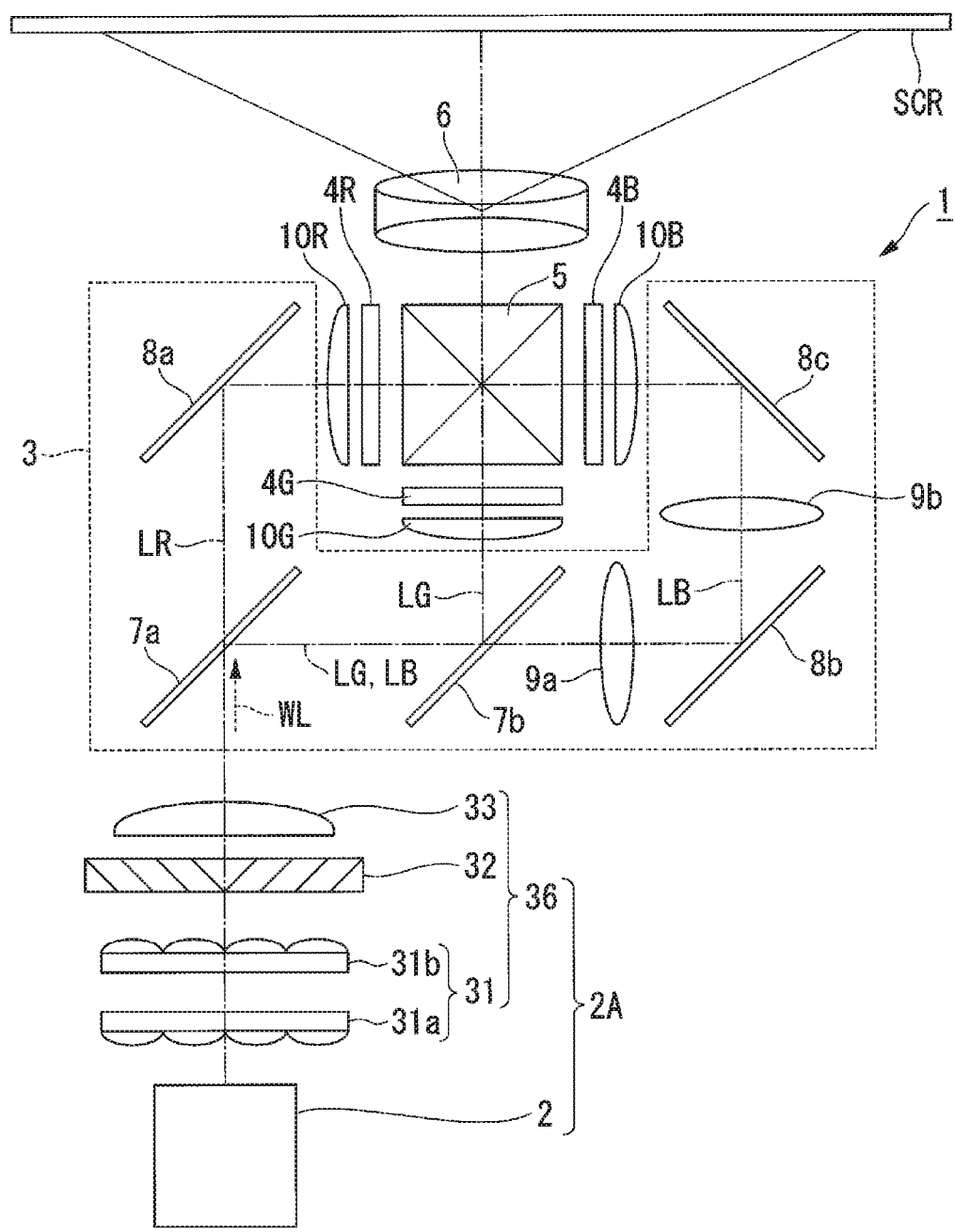
FIG. 1 is a plan view showing a schematic configuration of a projector.

FIG. 1 is the plan view showing the schematic configuration of the projector of the embodiment.

As shown in FIG. 1, a projector 1 of the embodiment is a projection image display apparatus that displays a color picture (image) on a screen SCR. The projector 1 uses three light modulation devices corresponding to respective color lights of a red light LR, a green light LG, and a blue light LB. The projector 1 uses a semiconductor laser from which high-intensity and high-power light is obtained as a light source of an illumination device.

Specifically, the projector 1 includes as illumination device 2A, a color separation system 3, a light modulation device 4R, a light modulation device 4G, a light modulation device 4B, a combining system. 5, and a projection optical device 6.

The illumination device 2A outputs an illumination light WL toward the color separation system 3. The illumination device 2A includes a light source device 2 and a homogenizer illumination system 36.

The homogenizer illumination system 36 includes an optical integration system 31, a polarization conversion element 32, and a superimposing system 33. Note that the polarization conversion element 32 is not essential. The homogenizer illumination system 36 homogenizes the intensity distribution of the illumination light WL output from the light source device 2 in an illuminated area.

The optical integration system 31 includes e.g. a lens array 31a and a lens array 31b. In the lens arrays 31a, 31b, plurality of lenses are arranged in array forms.

The illumination light WL passing through the optical integration system 31 enters the polarization conversion element 32. The polarization conversion element 32 includes e.g. a polarization separation film and a wave plate and converts the illumination light WL into linearly-polarized light.

The illumination light WL passing through the polarization conversion element 32 enters the superimposing system 33. The superimposing system 33 includes e.g. a convex lens and superimposes the illumination light WL output from the polarization conversion element 32 on the illuminated area. In the embodiment, the optical integration system 31 and the superimposing system 33 homogenize the illuminance distribution in the illuminated area.

The illumination light WL output from the homogenizer illumination system 36 enters the color separation system 3.

The color separation system 3 is a system for separation of the illumination light WL into the red light LR, the green light LG, and the blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirrored separates the illumination light WL from the light source device 2 into the red light LR, the green light LG, and the blue light LB. The first dichroic mirror 7a transmits the red light LR and reflects the green light LG and the blue light LB. On the other hand, the second dichroic mirror 7b separates the green light LG and the blue light LB. The second dichroic mirror 7b reflects the green light LG and transmits the blue light LB.

The first total reflection mirror 8a reflects the red light LR transmitted through the first dichroic mirror 7a toward the light modulation device 4R. The second total reflection mirror 8b and the third total reflection mirror 8c reflect the blue light LB transmitted through the second dichroic mirror 7b toward the light modulation device 4B. The green light LG is reflected toward the light modulation device 4G by the second dichroic mirror 7b.

The first relay lens 9a and the second relay lens 9b are placed at the light exiting side of the second dichroic mirror 7b in the optical path of the blue light LB.

The light modulation device 4R modulates the red light LR according to image information and forms a red image light. The light modulation device 4G modulates the green light LG according to the image information and forms a green image light. The light modulation device 4B modulates the blue light LB according to the image information and forms a blue image light.

For the light modulation device 4R, the light modulation device 4G, and the light modulation device 4B, e.g. transmissive liquid crystal panels are used. Further, pairs of polarizers (not shown) are placed at the light incident sides and the light exiting sides of the liquid crystal panels.

At the light incident sides of the light modulation device 4R, the light modulation device 4G, and the light modulation device 4B, a field lens 10R, a field lens 10G, and a field lens 10B are placed, respectively.

The combining system 5 combines and outputs the respective image lights from the light modulation device 4R, the light modulation device 4G, and the light modulation device 4B toward the projection optical device 6. For the combining system 5, e.g. a cross dichroic prism as used.

The projection optical device 6 includes a group of projection lenses. The projection optical device 6 enlarges and projects the image light combined by the combining system 5 toward the screen SCR.

Light Source Device

Next, the light source device 2 to which one aspect of the present disclosure is applied used for the above described illumination device 2A will be explained.

Figure 2:
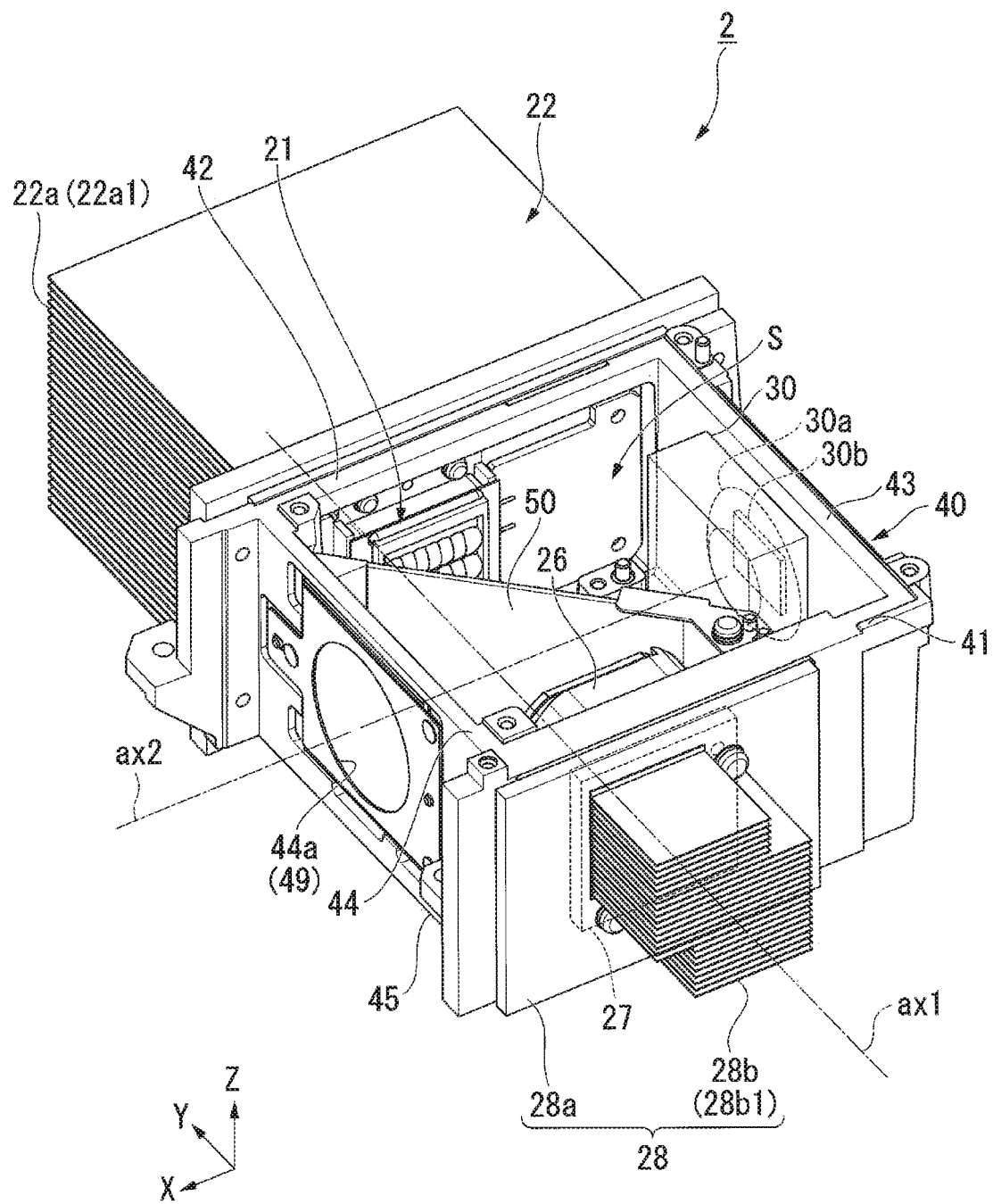
FIG. 2 is a perspective view showing a schematic configuration of a light source device.

FIG. 2 is the perspective view showing the schematic configuration of the light source device. In FIG. 2, for visibility of the drawing, the upper plate portion of the housing part is not shown. In the drawing used in the following explanation, position relationships among the respective members will be explained appropriately using an XYZ coordinate system. In FIG. 2, Z directions along a Z-axis correspond to vertical directions, X directions along an X-axis orthogonal to the Z-axis correspond to light output directions by the light source device 2, and a Y-axis is orthogonal to the X-axis and the Z-axis. Hereinafter, the +Z direction is referred to as "upside", the −Z direction is referred to as "downside", and the directions along the Z-axis are referred to as "upward and downward directions". Further, the +X direction is referred to as "left side", the −X direction is referred to as "right side", and the directions along the X-axis are referred to as "leftward and rghtward directions". Note that, in FIG. 2, the Z directions along the Z-axis are the vertical directions, however, the vertical directions change according to an installation posture of the projector 1.

As shown in FIG. 2, the light source device 2 includes a light source 21, a cooling member for light source 22, a light separation element 50, a pickup lens unit 26, a wavelength conversion unit 27, a cooling member for fluorescent material 28, a diffuser unit 30, and a housing part 40.

The cooling member for light source 22, the light source 21, the light separation element 50, the pickup lens unit 26, the wavelength conversion unit 27, and the cooling member for fluorescent material 28 are sequentially placed on an optical axis ax1. The diffuser unit 30 and the light separation element 50 are sequentially placed on an illumination light axis ax2. The optical axis ax1 and the illumination light axis ax2 are located within the same plane and orthogonal to each other.

The housing part 40 is formed using a metallic case member. The housing part 40 has a housing space S. The housing space S houses the light source 21, the light separation element 50, the diffuser unit 30, and the pickup lens unit 26. The cooling member for light source 22 and the cooling member for fluorescent material 28 are supported by the housing part 40.

The housing part 40 has a first side plate portion 41, a second side plate portion 42, a third side plate portion 43, a fourth side plate portion 44, and a bottom plate portion 45. The pickup lens unit 26 is attached to the first side plate portion 41. The second side plate portion 42 is provided to face the first side plate portion 41, to which the light source 21 is attached. The third side plate portion 43 is a member extending in directions crossing (orthogonal to) the first side plate portion 41 and the second side plate portion 42, to which the diffuser unit 30 is attached. The fourth side plate portion 44 is a member facing the third side plate portion 43 and extending in directions crossing (orthogonal to) the first side plate portion 41 and the second side plate portion 42.

The fourth side plate portion 44 has a light exiting portion 49 provided at the left side (+X side) of the light separation element 50 and transmitting the illumination light WL combined by the light separation element 50 and output toward outside. The light exiting portion 49 includes a through hole 44a penetrating the fourth side plate portion 44.

The cooling member for light source 22 includes a heatsink 22a and is thermally coupled to the light source 21. Here, thermal coupling between two members refers to a state in which heat can be transferred between the two members and includes not only direct contact between the two members but also indirect contact via a heat conduction member between the two members.

In the light source device 2 of the embodiment, the heat generated in the light source 21 is released from the cooling member for light source 22. The heatsink 22a is formed using a metal member with high radiation performance. The heatsink 22a has a plurality of fins 22a1 provided at the opposite side to the supporting surface that supports the light source 21. Note that the cooling performance of the heatsink 22a may be further improved by blowing to the plurality of fins 22a1 of the heatsink 22a by a cooling fan (not shown).

In the light source device 2 of the embodiment, the heat generated in the wavelength conversion unit 27 is released from the cooling member for fluorescent material 28. The cooling member for fluorescent material 28 is attached to the pickup lens unit 26 supporting via screw members 13.

The cooling member for fluorescent material 28 includes a supporting portion 28a and a heatsink 28b. The heatsink 28b has a plurality of fins 28b1 provided in the supporting portion 28a. Note that the cooling performance of the heatsink 28b may be further improved by blowing to the plurality of fins 28b1 of the heatsink 28b by a cooling fan (not shown).

FIG. 3 schematically shows optical paths of lights passing through the housing space of the housing part. Note that, in FIG. 3, the respective optical members through which lights pass within the housing part 40 are simplified. As shown in FIG. 3, the light source 21 includes a plurality of semiconductor lasers 21a. The light source 21 has a package structure in which the plurality of semiconductor lasers 21a are arranged in an array form within a plane orthogonal to the optical axis ax1. For example, the semiconductor laser 21a outputs a blue beam B as excitation light, which will be described later. The blue beam B is e.g. a laser beam having a peak wavelength of 460 nm. The beams B output from the respective semiconductor lasers 21a are converted into parallel lights by a collimator lens and output. In the embodiment, the light source 21 outputs a pencil of light BL of the plurality of beams B. Note that the number of the semiconductor lasers 21a is not limited.

The pencil of light BL enters the light separation element 50. For example, the light separation element 50 is formed using a mirror having an optical property that reflects part of the incident lights and transmits the other lights. The light separation element 50 is placed at angles of 45° relative to the optical axis ax1 and the illumination light axis ax2.

Part of the pencil of light BL is reflected by the light separation element 50 toward the diffuser unit 30. The rest of the pencil of light BL is transmitted through the light separation element 50 toward the pickup lens unit 26. Hereinafter, the part of the pencil of light BL reflected by the light separation element 50 and entering the diffuser unit 30 is referred to as "first pencil of light BL1" and the rest of the pencil of light BL transmitted through the light separation element 50 and entering the pickup lens unit 26 is referred to as "excitation light BL2".

The diffuser unit 30 includes a pickup lens 30a and a diffuser 30b. The pickup lens 30a collects and enters the first pencil of light BL1 into the diffuser 30b. The diffuser 30b diffusely reflects the first pencil of light BL1 output from the pickup lens 30a toward the light separation element 50. Hereinafter, the light diffusely reflected by the diffuser 30b is referred to as "diffusely reflected light BL3".

The diffusely reflected light BL3 is parallelized by the pickup lens 30a and enters the light separation element 50. The diffusely reflected light BL3 entering the light separation element 50 is transmitted by the light separation element 50 toward the light exiting portion 49.

The pickup lens unit 26 collects the excitation light BL2 toward the fluorescent material of the wavelength conversion unit 27. The pickup lens unit 26 has a collection system (optical element) 24 and a holding member 25 that holds the collection system 24. The collection system 24 includes a first lens 24a, a second lens 24b, and a third lens 24c. The excitation light BL2 output from the pickup lens unit 26 enters a fluorescent material 34 of the wavelength conversion unit 27 as excitation light.

The wavelength conversion unit 27 has the fluorescent material 34 and a supporting substrate 35 that supports the fluorescent material 34. The supporting substrate 35 is formed using e.g. a highly heat conductive material such as copper.

Note that a reflection mirror (not shown) that reflects part of fluorescence YL generated in the fluorescent material 34 toward the outside is provided between the fluorescent material 34 and the supporting substrate 35. The wavelength conversion unit 27 of the embodiment is a reflective fluorescence emitting device that outputs the fluorescence YL in the opposite direction to the incident direction of the excitation light BL2.

The fluorescent material 34 of the embodiment includes fluorescent material particles that absorb and convert the excitation light BL2 into yellow fluorescence YL and output the fluorescence. As the fluorescent material particles, e.g. YAP (yttrium aluminum garnet)-containing fluorescent material may be used.

For example, as the fluorescent material 34, a fluorescent material layer formed by dispersion of fluorescent material particles in an inorganic binder of alumina or the like or a fluorescent material layer formed by sintering of fluorescent material particles without using a binder may be preferably used.

The fluorescence YL output from the fluorescent material 34 is parallelized by the pickup lens unit 26 and enters the light separation element 50. The fluorescence YL entering the light separation element 50 is reflected by the light separation element 50. The fluorescence YL reflected by the light separation element 50 is combined with the diffusely reflected light BL3 transmitted through the light separation element 50, and thereby, generates the white illumination light WL. The illumination light WL is output from the light exiting portion 49 to the outside of the housing part 40 and enters the optical integration system 31 of the homogenizer illumination system 36 shown in FIG. 1.

FIG. 4 is the exploded view of the main part configuration of the light source device. Specifically, FIG. 4 shows the attachment structure of the pickup lens unit 26, the wavelength conversion unit 27, and the cooling member for fluorescent material 28 to the housing part 40. FIG. 5 is the sectional view of the main part of the light source device FIG. 5 shows the section along a plane parallel to the XY plane in the main part of the light source device 2.

As shown in FIG. 4 or FIG. 5, the pickup lens unit 26 is fixed to the housing part 40 via screw members 11. The pickup lens unit 26 is attached to the housing part 40 to be located on the optical path (optical axis ax1) of the excitation light BL2 within the housing space S.

The housing part 40 has a supporting plate 46 for supporting the holding member 25 of the pickup lens unit 26. The supporting plate 46 has a plurality of screw holes 46a for fixing the holding member 25 of the pickup lens unit 26, a plurality of positioning pins 46b for positioning the pickup lens unit 26, and an opening portion. 46c for insertion of the holding member 25 of the pickup lens unit 26. The supporting plate 46 of the embodiment has the three screw holes 46a and the two positioning pins 46b.

The wavelength conversion unit 27 is fixed to the pickup lens unit 26 via screw members 12. The wavelength conversion unit 27 is fixed to the holding member 25 of the pickup lens unit 26 so that the fluorescent material 34 may face the third lens 24c. That is, in the embodiment, the wavelength conversion unit 27 is attached to the housing part 40 via the pickup lens unit 26.

The cooling member for fluorescent material 28 is attached to the pickup lens unit 26 fixed to the housing part 40 via the screw members 13 and covers the opening formed in the first side plate portion 41 in the housing part 40.

In the embodiment, a third elastic member 59 is provided between the cooling member for fluorescent material 28 and the housing part 40. For example, the third elastic member 59 is a closed-cell type member formed using silicone foam. Here, the closed-cell type member refers to a member having a gas-proof property without communication between holes such as air holes inside.

Subsequently, the configuration of the holding member 25 will be explained.

The holding member 25 has a lens holding portion 25a and an attachment portion 25b. The lens holding portion 25a is a portion substantially in a cylindrical shape for holding the respective lenses 24a to 24c forming the collection system 24. The attachment portion 25b is a portion provided to cover the near side (one side) of the lens holding portion 25a for attaching the holding member 25 to the housing part 40.

A part of the attachment portion 25b is provided to spread outward in the radial directions of the lens holding portion 25a. The attachment portion 25b has a lens opening portion 51, a plurality of through holes 52, a pair of pin holes 53, a ring-shaped recessed portion 54, first screw holes 55, and second screw holes 56.

The lens opening portion 51 is provided in the center part of the attachment portion 25b. Inside of the lens opening portion 51, the third lens 24c held by the lens holding portion 25a is placed to be opposed. The through holes 52 are holes for insertion of the screw members 11 and provided in positions corresponding to the screw holes 46a formed in the supporting plate 46. The pair of pin holes 53 are holes for insertion of the positioning pins 46b of the supporting plate 46 and provided in positions corresponding to the positioning pins 46b. One of the pair of pin holes 53 is formed to be larger than the outer shape of the pin 46b. Thereby, the pins 16b are easily inserted into the pin holes 53. The recessed portion 54 is provided to surround the lens opening portion 51.

The first screw holes 55 and the second screw holes 56 are provided outside in the radial directions of the recessed portion 54. Twos of the first screw holes 55 and the second screw holes 56 are respectively provided.

The pickup lens unit 26 of the embodiment is fixed to the supporting plate 46 of the housing part 40 by fastening of the screw members 11 into the screw holes 46a of the supporting plate 46 with the lens holding portion 25a inserted into the opening portion 46c of the supporting plate 46.

A second elastic member 57 is provided between the holding member 25 of the pickup lens unit 26 and the supporting plate 46 of the housing part 40. For example, the second elastic member 57 is a closed-cell type member formed using silicone foam.

As shown in FIG. 5, the second elastic member 57 is placed to surround the base of the lens holding portion 25a. Accordingly, when the pickup lens unit 26 is fixed to the supporting plate 46 of the housing part 40 by the screw members 11, the second elastic member 57 is provided to surround the opening portion 46c and pressed between the holding member 25 and the housing part 40. Thereby, the second elastic member 57 may close a gap produced between the holding member 25 closing the opening portion 46c and the housing part 40 (supporting plate 46). Therefore, the second elastic member closes the gap that causes communication between the housing space S within the housing part 40 and the outside and suppresses entry of dust into the housing space S.

As described above, the wavelength conversion unit 27 is fixed to the attachment portion 25b by the screw members 12. As below, the fixing structure of the wavelength conversion unit 27 to the attachment portion 25b will be explained.

In the supporting substrate 35 of the wavelength conversion unit 27, first through holes 35a and second through holes 35b are formed. The first through holes 35a are holes for insertion of the screw members 12. The second through holes 35b are holes for insertion of the screw members 13.

In the embodiment, twos of the first through holes 35a and the second through holes 35b are formed in the supporting substrate 35. The two first through holes 35a are respectively provided substantially on the diagonal line of the supporting substrate 35, and the two second through holes 35b are respectively provided substantially on the diagonal line of the supporting substrate 35.

The first through holes 35a are formed in the positions corresponding to the first screw holes 55. The screw members 12 are inserted into the first through holes 35a and fastened into the first screw holes 55 of the attachment portion 25b. Thereby, the supporting substrate 35 is fixed to the attachment portion 25b. Therefore, the position of the supporting substrate 35 in the optical axis ax1 direction relative to the pickup lens unit 26 is restricted.

As shown in FIG. 5, the fluorescent material 31 is provided on a front surface (first surface) 37 opposite to a rear surface 38 in the supporting substrate 35. The fluorescent material 34 is provided on the front surface 37 to be located on the optical axis ax1 with the supporting substrate 35 fixed to the pickup lens unit 26.

In the embodiment, as shown in FIG. 4, the first through holes 35a are formed in portions in which recesses 39 are provided of the rear surface 38 of the supporting substrate 35. On the rear surface 38 of the supporting substrate 35, level differences are produced by the recesses 39. The differences by the recesses 39 are set to be larger than the heights of the head portions of the screw members 12. Thereby, when the screw members 12 are fastened, the head portions of the screw members 12 are placed in positions lower than the rear surface 38 of the supporting substrate 35.

As shown in FIG. 4, a first elastic member (elastic member) 58 is provided between the holding member 25 of the pickup lens unit 26 and the supporting substrate 35 of the wavelength conversion unit 27. For example, the first elastic member 58 is a closed-cell type member formed using silicone foam. The first elastic member 58 is held in the recessed portion 54 formed in the attachment portion 25b of the holding member 25.

As shown in FIG. 5, in the embodiment, the thickness of the first elastic member 58 is larger than the depth of the recessed portion 54. That is, the first elastic member 58 is provided to project relative to the surface of the attachment portion 25b. Accordingly, when the wavelength conversion unit 27 is fixed to the attachment portion 25b by the screw members 12, the first elastic member 58 is pressed between the holding member 25 and the supporting substrate 35. As described above, the first elastic member 58 is provided in the recessed portion 54 surrounding the outside in the radial directions of the opening portion 46c, and the first elastic member 58 is provided along the front surface 37 of the supporting substrate 35 to surround the fluorescent material 34 placed within the opening portion 46c.

Thereby, the gap produced between the lens opening portion 51 of the holding member 25 and the supporting substrate 35 is closed by the first elastic member 58. Accordingly, the lens opening portion 51 of the holding member 25 is covered by the supporting substrate 35 with high sealability. Therefore, the fluorescent material 34 provided within the lens opening portion 51 is housed in the highly sealed state.

In the embodiment, the first screw holes 55 and the second screw holes 56 into which the screw members 12 for fixing the wavelength conversion unit 27 and the holding member 25 are inserted are located outside in the radial directions of the first elastic member 58. Accordingly, the screw holes 55, 56 for fastening of the screw members 12 are not passage routes of dust.

As shown in FIG. 5, the first elastic member 58 is provided to be held in the recessed portion 54 formed in the attachment portion 25b of the holding member 25. Thereby, the fluorescence YL output from the fluorescent material 34 is shielded by the attachment portion 25b and the fluorescence YL is harder to enter the first elastic member 58. Therefore, degradation of the first elastic member 58 due to the light is suppressed. That is, a part of the attachment portion 25b functions as a light shielding member that suppresses entry of the light into the first elastic member 58. Note that a member such as a light shielding plate that shields the light entering the first elastic member 58 may be separately provided.

The cooling member for fluorescent material 28 is attached to the pickup lens unit 26 via the screw members 13. Through holes 28a1 for insertion of the screw members 13 are formed in the supporting portion 28a of the cooling member for fluorescent material 28.

The second through holes 35b are formed in the positions corresponding to the second screw holes 56 of the attachment portion 25b. The screw members 13 are inserted into the through holes 28a1 of the supporting portion 28a and the second through holes 35b and fastened into the second screw holes 56 of the attachment portion 25b. Thereby, the cooling member for fluorescent material 28 (supporting portion 28a) is fixed to the pickup lens unit 26 via the screw members 13 together with the wavelength conversion unit 27.

As described above, the head portions of the screw members 12 are lower than the rear surface 38 of the supporting substrate 35 and the screw members 12 are not in contact with the supporting portion 28a of the cooling member for fluorescent material 28. Thereby, the rear surface 38 of the supporting substrate 35 and the supporting portion 28a of the cooling member for fluorescent material are in contact without a gap, and the heat of the fluorescent material 34 is efficiently transferred to the cooling member for fluorescent material 28 via the supporting substrate 35. Therefore, the heat of the fluorescent material 34 may be efficiently released.

As shown in FIG. 5, the cooling member for fluorescent material 28 fixed to the pickup lens unit 26 via the screw members 13 presses the third elastic member 59 between the housing part 40 and itself. Thereby, the third elastic member 59 closes the gap produced between the housing part 40 and the cooling member for fluorescent material 28, and may suppress entry of dust into the housing space S within the housing part 40 together with the first elastic member 58 and the second elastic member 57 and increase dustproof performance of the light source device 2.

As described above, according to the light source device 2 of the embodiment, the first elastic member 58 placed between the supporting substrate 35 and the holding member 25 is provided, and thereby, the fluorescent material 34 may be held in the highly sealed state and protected from the dust. Further, according to the light source device 2 of the embodiment, the fluorescent material 34 may be sealed without using an adhesive agent, and thereby, degradation of the fluorescent material 24 due to the gas generated from the adhesive agent may be suppressed.

In the embodiment, the first elastic member 58 is provided along the front surface 37 of the supporting substrate 35 to surround the fluorescent material 34, and thereby, the fluorescent material 34 may be held with high sealability.

Further, in the embodiment, the first elastic member 58 is placed in the recessed portion 54 provided in the holding member 25, and thereby, the first elastic member 58 may be accurately placed in a predetermined location. The first elastic member 58 is placed within the recessed portion 54, and thereby, the gap between the holding member 25 and the front surface 37 of the supporting substrate 35 is smaller and it is harder for a light to enter the first elastic member 58. Therefore, degradation of the first elastic member 58 due to the light may be suppressed and the life of the first elastic member 58 may be extended.

According to the projector 1 of the embodiment, the above described light source device 2 is provided and the projector 1 has higher reliability and can display high-brightness images over a long period.

The present disclosure is not limited to the above described embodiments, but changes can be appropriately made without departing from the scope of the present disclosure.

For example, in the above described embodiments, the case where the recessed portion 54 holding the first elastic member 58 is provided in the holding member 25 of the pickup lens unit 26 is taken as an example, however, the recessed portion may be provided in the front surface of the supporting substrate 35. Or, the recessed portions may be provided in both the holding member 25 and the supporting substrate 35.

Further, in the above described embodiments, a spring member may intervene between the front surface 37 of the supporting substrate 35 and the attachment portion 25b of the holding member 25. According to the configuration, the spring member expands and contracts by adjustment of the degrees of fastening of the screw members 12, and the distance between the supporting substrate 35 and the pickup lens unit 26 can be adjusted. The distance between the supporting substrate 35 and the pickup lens unit 26 is adjusted, and thereby, the pickup lens unit having the collection system with various focal distances may be used and the versatility of the light source device 2 may be improved.

In the above described embodiments, as the light separation element 50, the mirror that transmits part of the incident light and reflects the rest is taken as an example, however, the present disclosure is not limited to that. A polarization beam splitter that separates the pencil of light BL according to the polarization direction may be used.

Further, in the above described embodiments, the projector 1 including the three light modulation devices 4R, 4G, 4B is exemplified, however, the embodiments can be applied to a projector that displays a color picture with a single light modulation device. As the light modulation device, a digital mirror device may be used.

In the above described embodiments, the example in which the light source device according to the present disclosure is mounted on the projector is shown, however, the device is not limited to that. The light source device according to the present disclosure may be applied to a lighting device, a headlight of an automobile, or the like.

What is claimed is:

1. A light source device defining a radial direction and comprising;
   a light source;
   a wavelength conversion element having a fluorescent material that a light output from the light source enters and a supporting substrate that supports the fluorescent material;
   an optical element guiding the light output from the light source to the fluorescent material;
   a holding member holding the optical element; and
   a housing part providing a housing space in an optical path of the light output from the light source and housing at least the optical element and the holding member in the housing space,
   wherein the supporting substrate is fixed to the holding member by a first screw member, the holding member is fixed to the housing part by a second screw member,
   a first elastic member is configured to form a seal between the supporting substrate and the holding member, and
   the first screw member and the second screw member are positioned outside of the first elastic member in the radial direction.

2. The light source device according to claim 1, wherein the supporting substrate has a first surface,
   the fluorescent material is provided on the first surface, and
   the first elastic member is provided along the first surface to surround the fluorescent material.

3. The light source device according to claim 1, wherein a recessed portion is provided at least in one of the supporting substrate and the holding member, and
   the first elastic member is placed in the recessed portion.

4. The light source according to claim 2, wherein
   a recessed portion is provided at least in one of the supporting substrate and the holding member, and
   the first elastic member is placed in the recessed portion.

5. A projector comprising:
   the light source device according to claim 1;
   a light modulation device that modulates the light from the light source device according to image information; and
   a projection optical device that projects the light modulated by the light modulation device.

6. A projector comprising:
   the light source device according to claim 2;
   a light modulation device that modulates the light from the light source device according to image information; and
   a projection optical device that projects the light modulated by the light modulation device.

7. A projector comprising:
   the light source device according to claim 3;
   a light modulation device that modulates the light from the light source device according to image information; and
   a projection optical device that projects the light modulated by the light modulation device.

8. A projector comprising:
   the light source device according to claim 4;
   a light modulation device that modulates the light from the light source device according to image information; and
   a projection optical device that projects the light modulated by the light modulation device.

9. The light source device according to claim 1, further comprising:
   a cooling member for fluorescent material in contact with the supporting substrate of the wavelength conversion element, and
   a second elastic member configured to form a seal between the housing part and the cooling member for fluorescent material.

10. The light source device according to claim 9, further comprising:
    a third screw member fixing the cooling member for fluorescent material to the holding member through the supporting substrate.

11. The light source device according to claim 10, wherein the third screw member is positioned outside of the first elastic member in the radial direction.

12. A light source device comprising:
    a housing part that has a housing space;
    a pickup lens unit that has a lens holding member holding a lens, and that is attached to a first side plate portion of the housing part;
    a light source that is attached to a second side plate portion of the housing part;
    a diffuser unit that is attached to third plate portion of the housing part;
    a light separation element that is disposed in the housing space;
    a supporting substrate that supports a fluorescent member and that is fixed to the lens holding member; and
    a first elastic member that is configured to form a seal between the supporting substrate and the lens holding member.

13. The light source device according to claim 12, wherein
    the light source defines a radial direction,
    the supporting substrate is fixed to the lens holding member by a first screw member,
    the lens holding member is fixed to the housing part by a second screw member, and
    the first screw member and the second screw member are positioned outside the first elastic member in the radial direction.

14. The light source device according to claim 13, further comprising:
    a cooling member for fluorescent member in contact with the supporting substrate, and
    a second elastic member configured to form a seal between the housing part and the cooling member for fluorescent member.

15. The light source device according to claim 14, further comprising:
    a third screw member fixing the cooling member for fluorescent member to the lens holding member through the supporting substrate.

16. The light source device according to claim 15, wherein
    the third screw member is provided outside of the first elastic member in the radial direction.

* * * * *